(12) United States Patent
Taylor et al.

(10) Patent No.: US 10,032,311 B1
(45) Date of Patent: Jul. 24, 2018

(54) SYNTHETIC IMAGE ENHANCING SYSTEM, DEVICE, AND METHOD

(71) Applicants: Max G. Taylor, Hiawatha, IA (US);
Scott E. Schultz, Cedar Rapids, IA (US); Matthew J. Cunnien, Marion, IA (US); Michael J. Armstrong, Central City, IA (US); Ryan J. Olson, Marion, IA (US); Peter J. Flugstad, Marion, IA (US); Shawn M. Spencer, Cedar Rapids, IA (US)

(72) Inventors: Max G. Taylor, Hiawatha, IA (US);
Scott E. Schultz, Cedar Rapids, IA (US); Matthew J. Cunnien, Marion, IA (US); Michael J. Armstrong, Central City, IA (US); Ryan J. Olson, Marion, IA (US); Peter J. Flugstad, Marion, IA (US); Shawn M. Spencer, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 124 days.

(21) Appl. No.: 14/499,907

(22) Filed: Sep. 29, 2014

(51) Int. Cl.
*G06T 19/00* (2011.01)
*G01C 21/00* (2006.01)

(52) U.S. Cl.
CPC .......... *G06T 19/006* (2013.01); *G01C 21/005* (2013.01)

(58) Field of Classification Search
None
See application file for complete search history.

(56) References Cited

U.S. PATENT DOCUMENTS

| 8,019,736 B1 | 9/2011 | Postnikov et al. |
| 8,384,730 B1 * | 2/2013 | VanDerKamp ........ G01C 23/00 340/945 |
| 8,718,915 B1 * | 5/2014 | Turcios ................ G01C 23/005 342/176 |

(Continued)

OTHER PUBLICATIONS

Federal Aviation Administration; Airworthiness Approval of Enhanced Vision System, Synthetic Vision System, Combined Vision System, and Enhanced Flight Vision System Equipment, Advisory Circular ("AC") 20-167, Jun. 22, 2010, pp. 3-8.

*Primary Examiner* — Mark Zimmerman
*Assistant Examiner* — Nurun N Flora
(74) *Attorney, Agent, or Firm* — Daniel M. Barbieri; Donna P. Suchy; Angel N. Gerdzhikov (57) ABSTRACT

Present novel and non-trivial system, device, and method for enhancing a three-dimensional synthetic image are disclosed. The image generating system is comprised of a first image data source, a second image data source, an image processing unit ("IPU"), and a display system. The IPU may be configured to receive first image data of a first image of a first external scene produced from object data; receive second image data of a second image of a second external scene produced from point cloud data acquired by one or more image capturing devices or object data augmented with point cloud data; combine the first image data with the second image data to produce third image data of a third image of the first external scene; and provide the third image data set to the display system. Fourth image data could be received and included in the production of the three image data.

12 Claims, 8 Drawing Sheets

(56) References Cited

U.S. PATENT DOCUMENTS

| | | | |
|---|---|---|---|
| 2007/0005199 A1* | 1/2007 | He | G01C 23/00 701/16 |
| 2009/0040070 A1* | 2/2009 | Alter | G01C 23/00 340/945 |
| 2010/0207936 A1* | 8/2010 | Minear | G06T 7/0024 345/419 |
| 2010/0208981 A1* | 8/2010 | Minear | G06T 11/001 382/154 |
| 2011/0187704 A1* | 8/2011 | Chen | G06T 15/00 345/419 |
| 2013/0069801 A1* | 3/2013 | Schafhitzel | G06T 17/005 340/945 |
| 2014/0114461 A1* | 4/2014 | Hermary | G05B 19/4097 700/163 |
| 2014/0132733 A1* | 5/2014 | Mundhenk | G06T 3/4007 348/47 |

\* cited by examiner

SYNTHETIC IMAGE ENHANCING SYSTEM, DEVICE, AND METHOD

BACKGROUND

The inventive concepts disclosed herein pertain generally to the field of aircraft display units that present information to the crew of an aircraft.

Traditionally, a Synthetic Vision System (SVS) employed by an aircraft generates a three-dimensional synthetic image of a scene that is external to the aircraft (external scene). To generate the synthetic image, the SVS could acquire elevation data from a database. For example, the database could be a terrain database configured to store terrain data representative of terrain elevations contained in digital elevation models (DEM).

Generally, the terrain data of a DEM are stored as grids, and each grid represents an area of terrain and is commonly referred to as a terrain cell. Different sizes of the grids could correspond to different resolutions of data, where relatively large-sized grids correspond to relatively low resolution data when compared to smaller-sized grids corresponding to higher resolution data. In addition to terrain data, the database may also be implemented as, but is not limited to, a database configured to store data representative of surface features such as, but not limited to, obstacles, buildings, lakes and rivers, runways, and paved or unpaved surfaces other than runways. Once a database is deployed onboard an aircraft, the data could become outdated or stale due to natural forces such as wind, water, and ice and/or human activity such as the movements of people, vehicles, and construction activity.

Where low resolution data is employed, the elevations of multiple structures located within one terrain cell will not be stored. If these structures are included in one terrain cell containing one elevation value from which a synthetic image is generated, then the individuality of these discrete structures may not be individually and discretely rendered in the synthetic image. In such a case, the SVS may be unable to generate in a meaningful fashion multiple elevations within one cell, and the pilot would not be presented with an image representative of the external scene.

In addition to the SVS, an aircraft could employ an Enhanced Vision System (EVS) that employs one or more image capturing devices and/or a separate processor to generate enhanced image data representative of a real-world, three-dimensional image of the external scene. Radar systems and Light Detecting and Ranging (LIDAR) systems employ image capturing devices.

Generally, the radar and LIDAR systems may control the direction of an electromagnetic or photonic beam, respectively, by steering the beam horizontally and vertically as it is being transmitted during a sweep of a three-dimensional zone. When the beam strikes or reflects off an object, part of the energy is reflected back and received by the active sensors. The range of the object may be determined by measuring the elapsed time between the transmission and reception of the beam. The azimuth of the object may be determined as the angle to which the beam was steered in the horizontal direction relative to the longitudinal axis of the aircraft during the transmission/reception of the beam. The elevation or elevation angle of the object may be determined as the angle to which the beam was steered in the vertical direction relative to the longitudinal axis of the aircraft during the transmission/reception of the beam. During each sweep of the three-dimensional zone, the range, azimuth, and elevation of each point located within the zone may be collected and registered to produce point cloud data from which enhanced image data comprised of point cloud image data may be produced.

SUMMARY

Embodiments of the inventive concepts disclosed herein are directed to novel and non-trivial system, device, and method for enhancing a synthetic image that is presentable to a pilot. The enhanced synthetic image could be used to improve the situational awareness of a pilot by conveying to him or her at a glance point cloud image information presented within or against a synthetic image.

In one aspect, embodiments of the inventive concepts disclosed herein are directed to a system for generating a point cloud-based image. The system may include a source of first image data, a source of second image data, and an image processing unit (IPU). In some embodiments, the point cloud-based image generating system may include a display system having one or more display units.

In a further aspect, embodiments of the inventive concepts disclosed herein are directed to a method for generating a point cloud-based image. When properly configured, the IPU may receive first image data representative of a first external scene, receive second image data, and combine the first image data with the second image data to produce third image data representative of a third image of the first external scene. The first external scene may be produced to a first scale from object data, and the second image data may be representative of a second image of a second external scene produced to a second scale. The IPU may be further configured to receive fourth image data and further combine the fourth image data with the first image data and the second image data to produce the third image data. The IPU may be further configured to provide the third image data to the display system, where a point cloud scene and/or an augmented synthetic scene image represented in the third image data is presentable on a display unit and from which meaningful situational awareness about the height, range, and/or landing suitability of objects within the scene may be determined by a pilot at a glance. In some embodiments, meaningful situational awareness may be determined by a pilot at a glance through the use of one or more highlighters originating from point cloud image data.

DETAILED DESCRIPTION

In the following description, several specific details are presented to provide a thorough understanding of embodiments of the inventive concepts disclosed herein. One skilled in the relevant art will recognize, however, that the inventive concepts disclosed herein can be practiced without one or more of the specific details, or in combination with other components, etc. In other instances, well-known implementations or operations are not shown or described in detail to avoid obscuring aspects of various embodiments of the inventive concepts disclosed herein.

Figure 1:
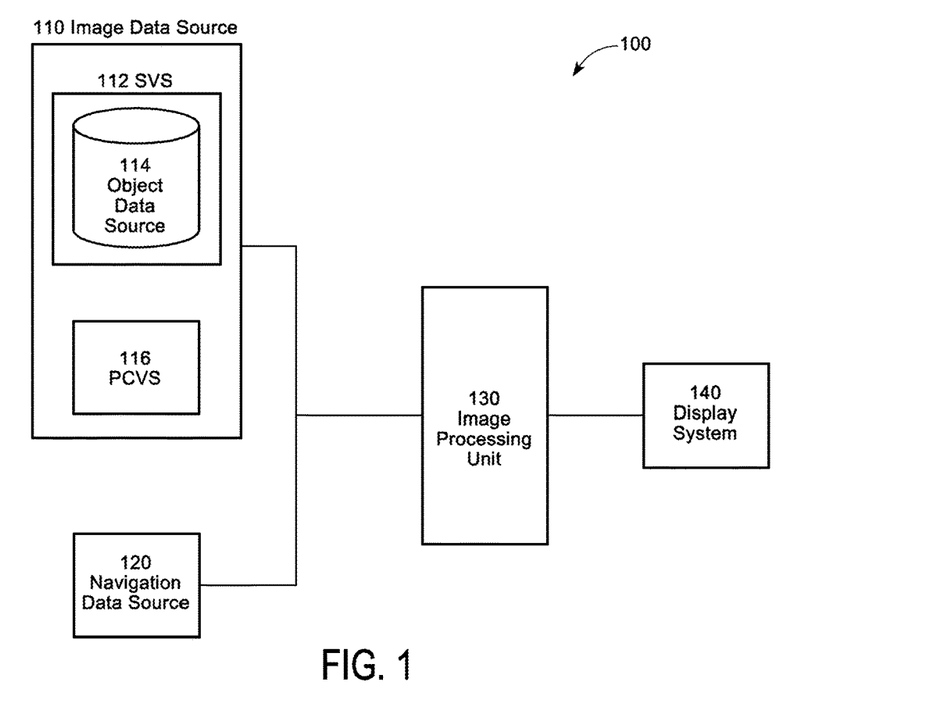
FIG. 1 depicts a functional block diagram of an embodiment of a system for enhancing a synthetic image.

FIG. 1 depicts a block diagram of a point cloud-based image generating system 100 suitable for implementation of the techniques described herein. The system 100 of an embodiment of FIG. 1 may include an image data source 110, a navigation data source 120, an image processor unit ("IPU") 130, and a display system 140.

The image data source 110 may include any system, sub-system, or component thereof that could produce image data representative of a real-world image of the scene outside the aircraft (e.g., external scene). The image data source 110 could include, but not be limited to, a Synthetic Vision System (SVS) 112 and/or Point Cloud Vision System (PCVS) 116.

The SVS 112 may be any system, sub-system, or component thereof which could produce image data representative of a real-world, three-dimensional single elevation terrain surface and obstacles found in a scene outside the aircraft (e.g., external scene) that may be subsequently presented on a two-dimensional display unit. The SVS 112 may include an object data source 114 and/or a separate processor.

The object data source 114 may be one or more sources of object data that could include terrain data and/or obstacle data. The object data source 114 could be a terrain database configured to store terrain data representative of terrain elevations contained in digital elevation models (DEM). Generally, the terrain data of a DEM are stored as grids, and each grid represents an area of terrain and is commonly referred to as a terrain cell. Different sizes of the grids could correspond to different resolutions of data, where relatively large-sized grids correspond to relatively low resolution data when compared to smaller-sized grids corresponding to higher resolution data. In addition to terrain data, the object data source 114 could further include, but is not limited to, a database configured to store data representative of surface features such as, but not limited to, obstacles, buildings, lakes and rivers, and paved or unpaved surfaces.

In some embodiments, the data stored in the object data source 114 could be augmented with real-time object data acquired by another system. As will be discussed in detail below, real-time point cloud data could be used to augment object data and/or update object data stored in the object data source 114.

The PCVS 116 may be any system, sub-system, or component thereof which could generate enhanced image data representative of a real-world, three-dimensional point cloud image of the external scene that may be subsequently presented on a two-dimensional display unit. The PCVS 116 may include one or more image capturing devices and/or a separate processor from which a set or point cloud of points of the external scene may be constructed, where a three-dimensional location of each point may be measured from the sensor and used to form the point cloud.

The image capturing device could be an active sensor(s) and/or a passive sensor(s) designed to be employed in one or more ranges of the electromagnetic spectrum (e.g., long-wave infrared, short-wave infrared, electro-optical infrared, and hyperspectral). In some embodiments, the active sensor could be any sensor designed or configured to transmit electromagnetic energy into the surrounding environment and then receive the transmitted electromagnetic energy that has been reflected from the surrounding environment. A common active sensor that is well-known to those skilled in the art is a radar system.

In some embodiments, the active sensor could be any sensor designed or configured to transmit photonic energy into the surrounding environment and then receive the transmitted photonic energy that has been reflected from the surrounding environment. A common active sensor that is well-known to those skilled in the art is an optical, laser-based, or Light Detecting and Ranging (LIDAR) (also referred to as Laser Detection and Ranging or LADAR) system.

In some embodiments, the passive sensor could be any sensor (e.g., a camera) designed or configured to detect visible and/or non-visible radiation emanating from the external scene in front of the aircraft. When a single sensor is employed, the resulting image could be comprised of a two-dimensional image. When multiple sensors are employed simultaneously (e.g., a stereoscopic camera and/or multiple single sensors capturing the same scene from different perspectives), the resulting image could be comprised of a three-dimensional point cloud image.

Figure 2:
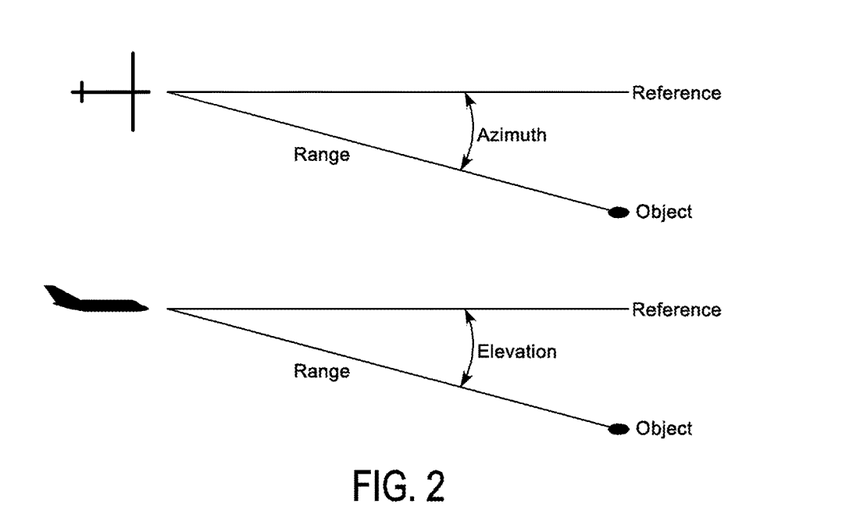
FIG. 2 illustrates a reference system from which points of objects sensed by image capturing devices may be measured.

Generally, the radar and LIDAR systems may control the direction of an electromagnetic or photonic beam, respectively, by steering the beam horizontally and vertically as it is being transmitted during a sweep of a three-dimensional zone. When the beam strikes or reflects off an object, part of the energy is reflected back and received by the active sensors. Referring to FIG. 2, the range of the object may be determined by measuring the elapsed time between the transmission and reception of the beam. The azimuth of the object may be determined as the angle to which the beam was steered in the horizontal direction relative to the longitudinal axis of the aircraft during the transmission/reception of the beam. The elevation or elevation angle of the object may be determined as the angle to which the beam was steered in the vertical direction relative to the longitudinal axis of the aircraft during the transmission/reception of the beam. During each sweep of the three-dimensional zone, the range, azimuth, and elevation of each point located within the zone may be collected and registered (e.g., mapped) to produce three-dimensional point cloud data from which enhanced image data comprised of point cloud image data may be produced. Likewise, the simultaneous employment of multiple passive sensors may be used to collect and register range, azimuth, and elevation of each point located within the image to produce three-dimensional point cloud data from which enhanced image data comprised of point cloud image data may be produced.

Returning to FIG. 1, the navigation data source 120 may include any system, sub-system, or component thereof employed as a source of navigation data including, but not limited to, an air/data system, an attitude heading reference system, an inertial guidance system (or inertial reference system), a global navigation satellite system (or satellite navigation system), and/or a flight management system, all of which are known to those skilled in the art. The navigation data source 120 could provide navigation data including, but not limited to, geographic location, altitude, and heading (or direction of flight). In some embodiments, aircraft position includes geographic location (e.g., latitude and longitude coordinates), altitude, or both. In some embodiments, aircraft orientation may include pitch, roll, and/or yaw information related to the attitude of the aircraft.

The IPU 130 may include any electronic data processing unit which executes software (e.g., computer instruction code) that could be stored in a digital memory storage device or a non-transitory computer-readable media (not depicted herein) including, but not limited to, RAM, ROM, CD, DVD, hard disk drive, diskette, solid-state memory, PCMCIA or PC Card, secure digital cards, and compact flash cards. The IPU 130 may be driven by the execution of software or computer instruction code containing algorithms developed for the specific functions embodied herein. The IPU 130 may be, or may include, one or more application-specific integrated circuits (ASICs) customized for the embodiments disclosed herein. Common examples of electronic data processing units are microprocessors, Digital Signal Processors (DSPs), Programmable Logic Devices (PLDs), and Programmable Gate Arrays (PGAs); however, for the embodiments herein, the term "processor" is not limited to such processing units and its meaning is not intended to be construed narrowly. For instance, the processor may also be implemented as a combination of electronic data processing units. As embodied herein, the IPU 130 could be a processor(s) used by or in conjunction with any other system of the aircraft including, but not limited to, the image data source 110, the navigation data source 120, and the display system 140, or any combination thereof.

The IPU 130 may be programmed or configured to receive as input data representative of information obtained from various systems and/or sources including, but not limited to, the image data source 110 and/or the navigation data source 120. As embodied herein, the terms "programmed" and "configured" are synonymous. The IPU 130 may be electronically coupled to systems and/or sources to facilitate the receipt of input data. As embodied herein, operatively coupled may be considered as interchangeable with electronically coupled. It is not necessary that a direct connection be made; instead, such receipt of input data and the providing of output data could be provided through a wired data bus, through a wireless network, or as a signal received and/or transmitted by the IPU 130 via a physical or a virtual computer port. The IPU 130 may be programmed or configured to execute the method discussed in detail below and provide output data to various systems and/or units including, but not limited to, the display system 140.

The display system 140 could be any system having at least one display unit configured to present one or more images. Although the following discussion is drawn toward display units physically installed in an aircraft, the embodiments disclosed herein may be applied to portable electronic devices configured with displays (e.g., laptop computers, electronic flight bags, handheld device, touch screen device, notebook, tablet, user-wearable device). The display unit could be implemented as, but not limited to, a Head-Up Display (HUD), Head-Down Display (HDD), Head-Mounted Display (HMD), Primary Flight Director, Navigation Display, Multi-Purpose Control Display Unit, Engine-Indicating and Crew-Alerting System Display, Electronic Centralized Aircraft Monitor, Multi-Function Display, Side Displays, or Data Link Control Display Unit.

Typically, the HUD is mounted in front of the pilot at windshield level and is directly in the pilot's field of vision, the HDD is mounted to an aircraft's flight instrument panel located in front of a pilot and below the windshield and the pilot's field of vision, and the HMD is display device mounted to a user-wearable device such as, but not limited to, a helmet. The HUD, HDD, and HMD could be employed as display units configured to present not only enhanced images and other images discussed herein but also images generated by a synthetic vision system and a combined vision system.

Figure 3:
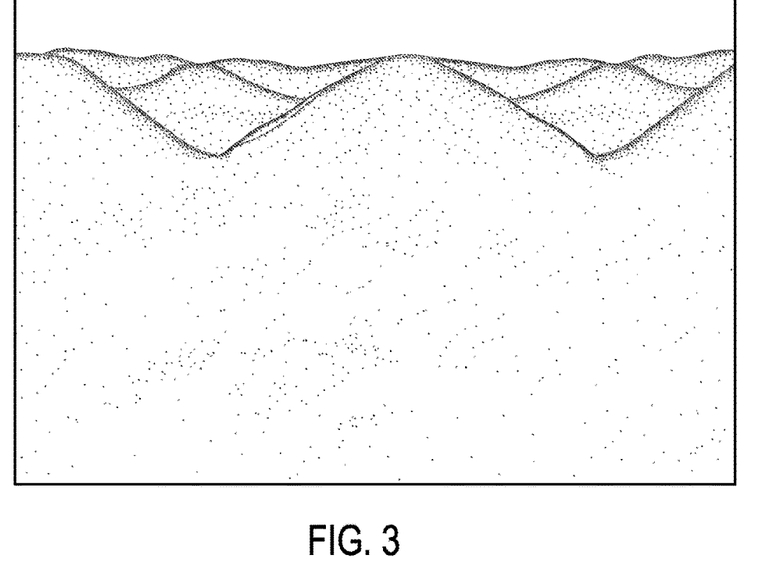
FIG. 3 illustrates a synthetic image of an external scene of terrain outside.

Referring to FIG. 3, a synthetic image of an external scene of terrain outside an aircraft is shown. Employing techniques known to those skilled in the art, the synthetic image may be generated by the SVS 112 based upon the navigation data representative of at least aircraft position and direction of flight provided by the navigation data source 120 and object data (e.g., terrain data) found in the object data source 114.

Figure 4:
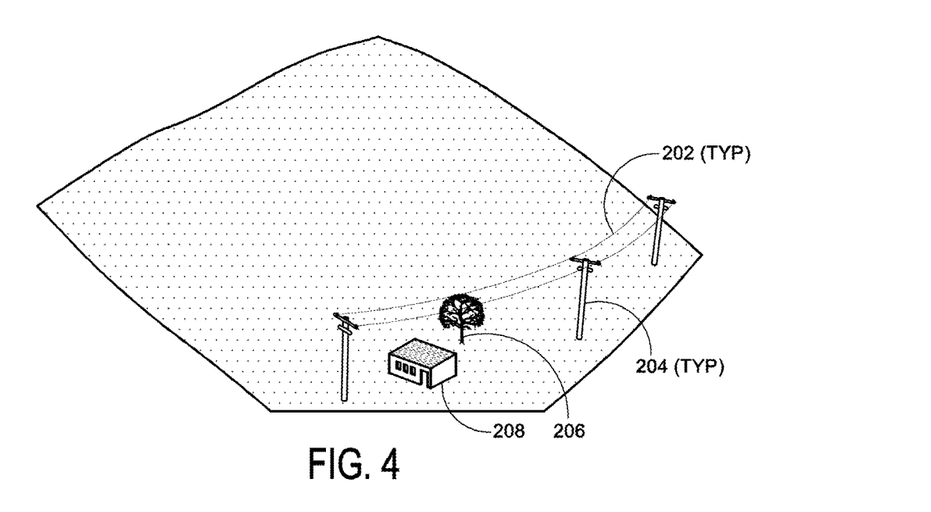
FIG. 4 illustrates a point cloud image of an external scene.

Referring to FIG. 4, a point cloud image of an external scene is shown. The point cloud image could be generated from data acquired by one or more active sensors that actively scan the external scene outside of the aircraft. It should be noted that, although the discussion herein will be drawn to point cloud images produced from active sensors, the point cloud image is not limited to an image produced exclusively from active sensors.

As shown in FIG. 4, the scene includes structures such as telephone wire 202 strung between telephone poles 204, a tree 206, and a building 208. For the purpose of illustration and not of limitation, it will be assumed that these structures have not been included in the object data source 114; that is, the terrain cells without structures are comprised of elevations of the ground or minimum elevation values. If these structures are collectively located within one terrain cell and have been included in the terrain cell containing one maximum elevation value of the tallest structure from which a synthetic image is generated, then the individuality of these discrete objects may not be individually and discretely rendered in the synthetic image. In such a case, the SVS 112 may be able to generate a synthetic image with a minimum or maximum elevation values but unable to generate in a meaningful fashion multiple elevations within one cell, and the pilot would not be presented with an image representative of the actual scene outside the aircraft with discrete objects.

As observed in FIG. 4, the active sensors may be configured to acquire a limited and smaller scene found within a larger scene shown in FIG. 3. Here, the active sensors have been configured to produce a point cloud with a limited area of the scene. Alternatively, the active sensors could be configured to produce a point cloud corresponding to a larger area of the scene from which the image could be trimmed to a configurable scene of the smaller area of the scene shown in FIG. 4.

Figure 5:
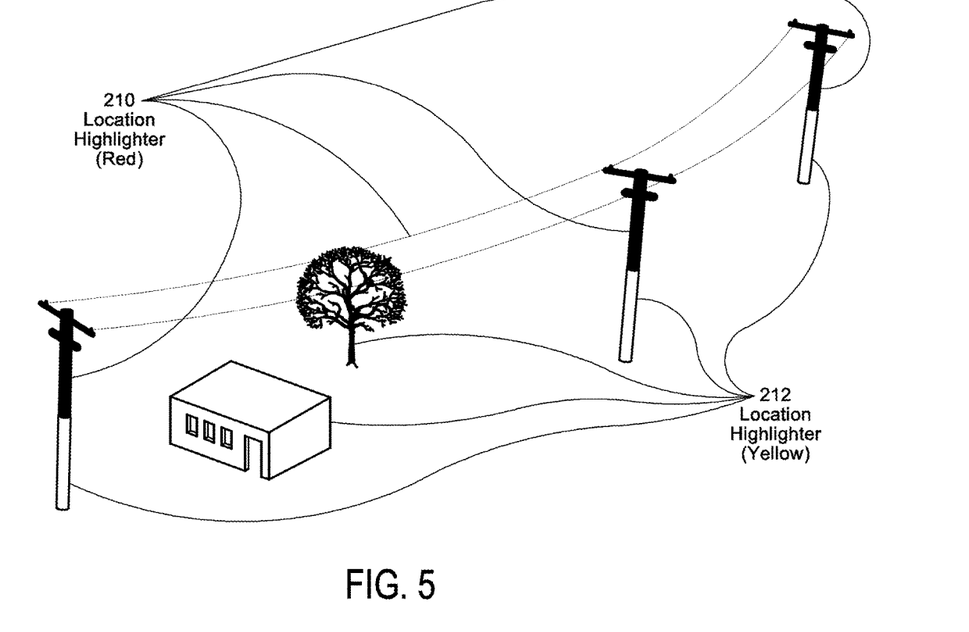
FIG. 5 illustrates the application of a configurable height color map to a point cloud image.

Referring to FIG. 5, a configurable height color map may be employed to provide the pilot with meaningful height information of point cloud objects measurable from a configurable height reference point. For the purpose of illustration and not limitation, the height reference point could be configured as the aircraft from which height measurements may be made. As the active sensors receive energy reflected from points of an object, vertical height information of each point of may be determined by employing the range, azimuth angle, and elevation angle to commonly-known trigonometric functions.

As shown in FIG. 5, the height color map has been configured with a plurality of colors to illustrate how colors may be used to depict height information to the pilot in the point cloud image. In one configuration, the telephone wires and the upper halves of the telephone poles 210 are shown in red; and the building, tree, and lower halves of the telephone poles 212 are shown in yellow. Although not shown, the terrain of the point cloud could be colored. A manufacturer and/or end-user may define the height ranges to which each color is applied in the point cloud image. With the use of the configurable height color map, meaningful situational awareness about the height of the scene within the point cloud may be determined by the pilot at a glance.

Figure 6:
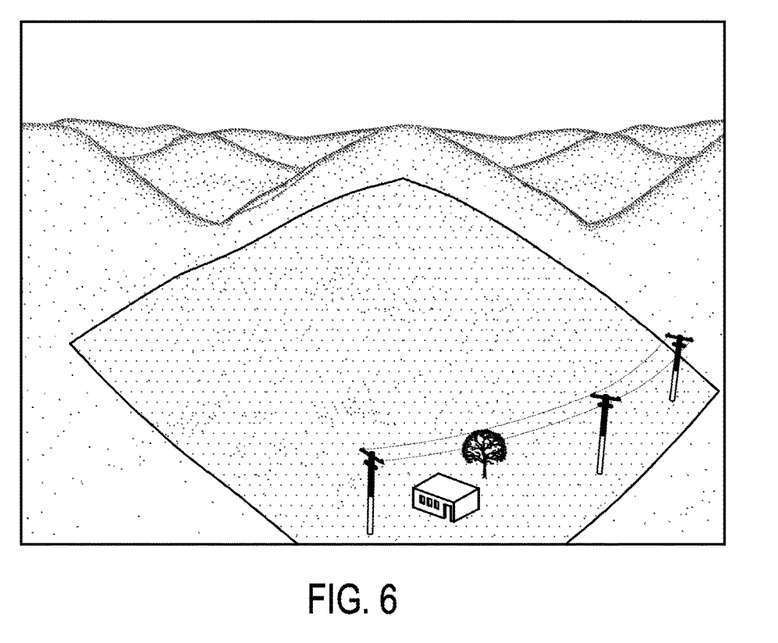
FIG. 6 illustrates a placement of a point cloud image as an inset within the synthetic image.

Referring to FIG. 6, the enhanced or point cloud image of FIG. 4 to which the height color map of FIG. 5 has been applied and may be combined with the synthetic image of FIG. 3 and placed within the synthetic image as an inset.

Figure 7:
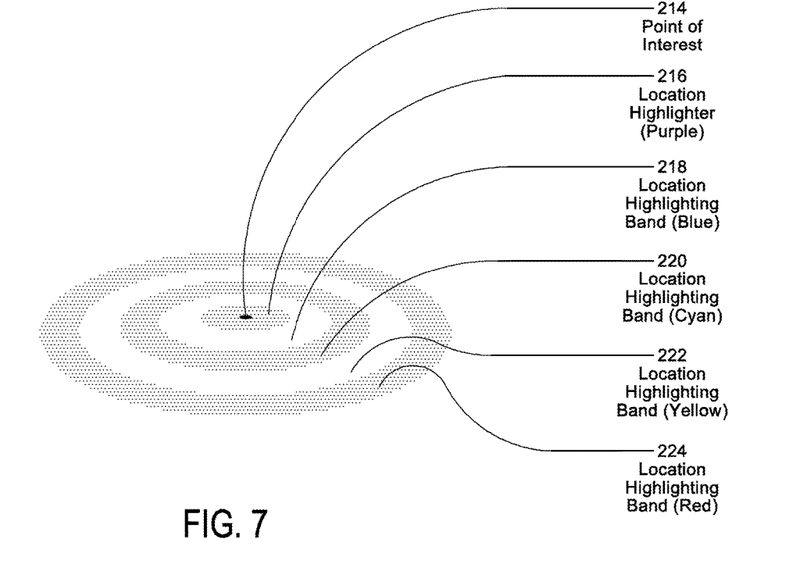
FIG. 7 illustrates the application of a configurable range color map to a point cloud image.

Referring to FIG. 7, a configurable range color map may be employed to provide the pilot with meaningful range or lateral distance information of point cloud objects (e.g., terrain) and measured from a configurable range reference point. For the purpose of illustration and not limitation, the aircraft could serve as the range reference point from which range or lateral measurements may be made. Furthermore, the configurable range reference point could be variable and/or controllable by the pilot; if the pilot has identified a location of interest within the point cloud (e.g., a landing zone), he or she could vary the color map so that the color of the location of interest stays the same as the aircraft is closes in on the location (i.e., range is decreasing).

As shown in FIG. 7, the range color map has been configured with a plurality of colors to illustrate how colors may be used to depict range or lateral distance information to the pilot in the point cloud image. In one configuration, colors forming a target could be employed. The location of a point of interest 214 (e.g., an intended landing spot) and surrounding area forming a "bull's-eye" of the target with a configurable radius has been highlighted with a purple location highlighter 216; then, a blue location highlighter 218 having a configurable width could be used to depict a first ring encircling the bull's-eye; then, a cyan location highlighter 220 having a configurable width could be used to depict a second ring encircling the first ring; then, a yellow location highlighter 222 having a configurable width could be used to depict a third ring encircling the second ring; and then, then, a red location highlighter 224 having a configurable width could be used to depict a fourth ring encircling the third ring. A manufacturer and/or end-user may define the range or lateral distance range from the aircraft at which the target is applied; furthermore, the manufacturer and/or end-user may configure the range or lateral distance to the target to be variable and controllable by the pilot as stated above. The pilot could control the placement of the target so that it will remain centered on the point of interest 214 as the aircraft closes in on the location. With the use of the configurable range color map, meaningful situational awareness about a location of interest within the scene of the point cloud may be determined by the pilot at a glance.

Figure 8:
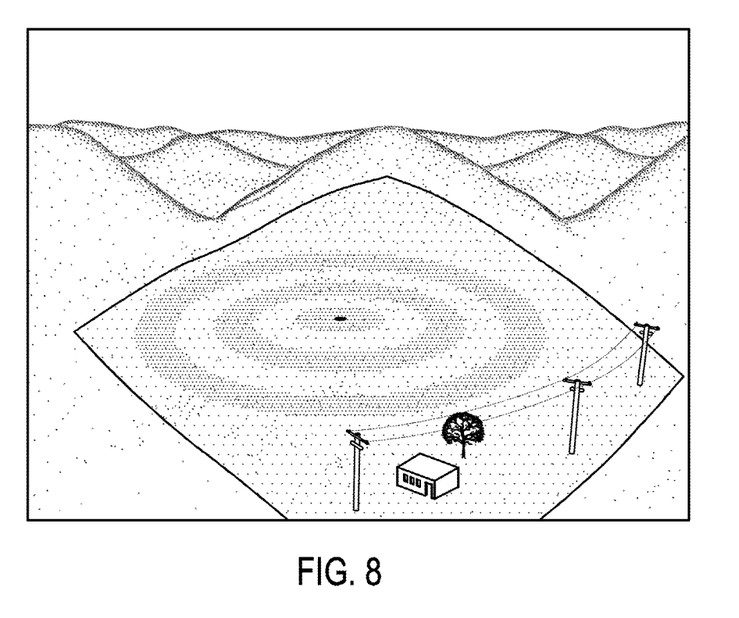
FIG. 8 illustrates a placement of a second point cloud image as an inset within the synthetic image.

Referring to FIG. 8, the enhanced or point cloud image of FIG. 4 to which the range color map of FIG. 7 has been applied may be combined with the synthetic image of FIG. 3 and placed within the synthetic image as an inset to provide range information. Although not shown, the height color map of FIG. 5 could also be applied and placed within the synthetic image (as shown in FIG. 6) to provide height information to the pilot.

As disclosed herein, color maps may be based upon measurements obtained by one or more sensors through the PCVS 116. In U.S. patent application Ser. No. 14/191,579 by Olson et al and entitled "Surface Information Generating System, Device, and Method," a reference incorporated herein in its entirety, highlighting bands based upon object data were disclosed.

It should be noted that, although the preceding discussion has been drawn to the synthetic image of FIG. 3 that was produced by the SVS 112 based upon, in part, terrain data found in the object data source 114, object data received and/or stored in the object data source 114 (e.g., a priori data) may be augmented with real-time elevation data of the point cloud, where geographic locations of one or more objects (e.g., terrain and/or structures) may be determined from aircraft position information represented in the navigation data.

In some embodiments, the augmented object data may be used to produce a second synthetic image that could be placed as an inset to the synthetic image of FIG. 3 generated from the non-augmented object data. In some embodiments, this second synthetic image could be used as an inset and replace the inset of the point cloud image of FIG. 6.

In addition to application of a color map to a point cloud based upon height and range as discussed above, a configurable landing suitability color map may be employed to convey landing suitability information, where such suitability information may be determined through an analysis of slope, roughness, obstacle detection, and moving obstacle penetration. The determination of suitability information could also include the use of an aircraft performance factor (s), aircraft orientation, aircraft approach angles, and other measurements when received. In addition to the color map being applied to the point cloud, it may be applied to the terrain scene generated with data received from the object data source 114.

A roughness analysis could be used to identify small variations in the surface of terrain such as rocks, cinder blocks, small posts as well as large obstructions and/or obstacles such as large telephone poles and buildings like those identified in FIG. 4. A slope analysis could be used to identify the grade of terrain including large sloping terrain regions associated with ditches and berms.

As discussed above, the employment of colors is configurable. For the purpose of illustration and not of limitation, thresholds may be employed by a manufacturer and/or end-user to convey roughness and slope information. For example, a safe threshold could be set when the roughness analysis yields a measurement of less than or equal to 6 inches and conveyed by the color green to indicate a suitable landing condition; a warning threshold could be set for a measurement of more than 24 inches and conveyed by the color red to indicate an unsuitable landing condition; and a caution threshold could be set for a measurements in between these and conveyed by the color yellow to indicate a less-than-suitable landing condition.

Similarly, a safe threshold could be set when the slope analysis yields a measurement of less than or equal to 6 degrees to which the color green may be employed to convey the existence of a suitable landing condition; a warning threshold could be set for a measurement of more than 15 degrees to which the color red may be employed to convey an unsuitable landing condition; and a caution threshold could be set for measurements in between these to which the color yellow may be employed to convey the existence of a less-than-suitable landing condition. When both analyses are employed, the color green could be employed when both safe thresholds are met, red when either warning threshold is met, and yellow when at least one caution threshold has reached but neither warning threshold.

In addition to the landing suitability color map, an additional analysis may be employed to determine the worst-case threshold located in the point cloud, the synthetic terrain, or both. Once the location of a worst-case threshold has been determined for roughness and slope, these locations may be highlighted graphically (e.g., modifying to the color to emphasize its location) and/or annotating textually to convey direction and magnitude of slope related to these locations. With the use of the configurable landing suitability color map with textual annotations, meaningful situational awareness about a specific location(s) of interest within the point cloud and/or terrain scene may be determined by the pilot at a glance.

As discussed above, the SVS 112 may be able to generate a synthetic image using maximum elevation values found in cells but unable to generate in a meaningful fashion multiple elevations of objects (e.g., both terrain and obstacles) within one cell. As such, the pilot would not be presented with an image representative of the actual scene outside the aircraft with discrete objects. Often times, a priori data of the object data source 114 may exist as "top of canopy" elevation data. In these cases, a mesh that is commonly formed when a terrain surface is rendered may include, for example, the tops of trees, building, and towers. Likewise, sensor(s) or image capturing device(s) of the PCVS 116 may detect the top of canopy as the scene is scanned. The IPU 130 may be programmed to determine the "non-terrain" items acquired by sensor(s) for which there are no object(s) found the object data source 114. Those objects sensed by sensors for which there is no corresponding data in the object data source may be flagged and colored.

Figure 9:
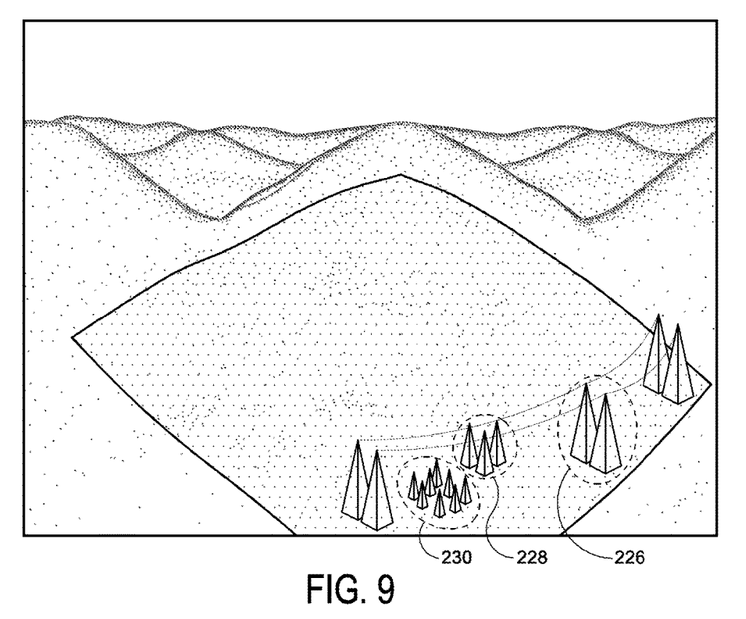
FIG. 9 illustrates an image of objects of a point cloud highlighted as polyhedrons.

In some embodiments, non-terrain items acquired by sensors that are not stored for in the object data source 114 may be depicted as polyhedrons. As shown in FIG. 9, the telephone poles 204, the tree 206, and the building 208 of FIG. 4 that have been acquired by sensors from which the point cloud image has been generated are depicted as polyhedrons 226, 228, and 230, respectively, where the sizes, types, and/or colors of which may be configurable by a manufacturer and/or end-user. This depiction could enhance a pilot's situational awareness by providing a more intuitive view of the scene as the difference or mismatch between the terrain surface and non-terrain objects is clearly distinguished.

Figure 10:
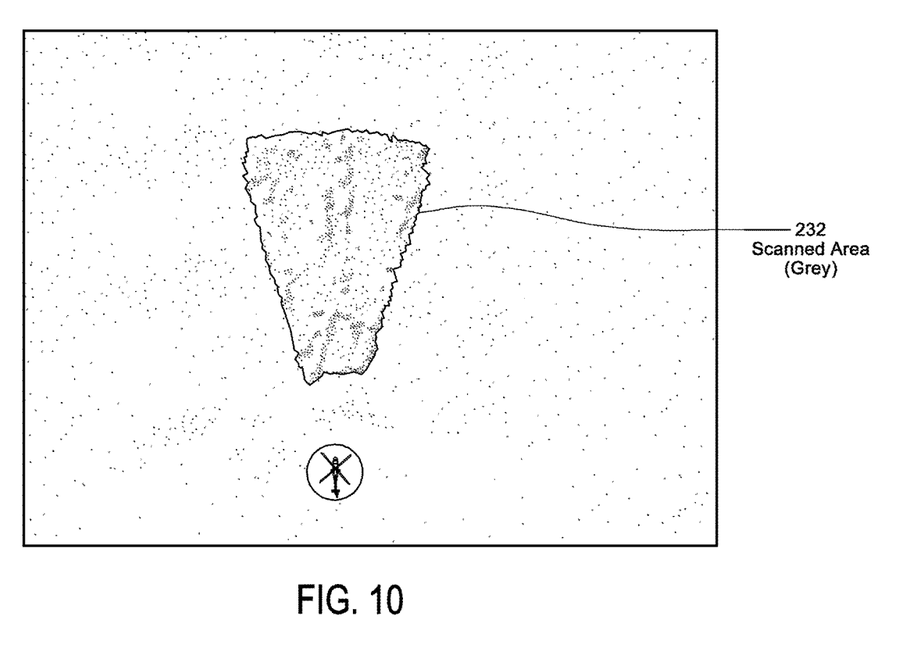
FIG. 10 illustrates a highlighter of a successfully scanned scene.

In addition to the detection of mismatched objects, the IPU 130 may be programmed to distinguish a two-dimensional scene where the on-board sensor has scanned (and received a valid return). For example, a grey color could be employed to indicate an area that have been successfully scanned by sensor(s) of the PCVS 116. As shown in FIG. 10, a successfully scanned area 232 of a two-dimensional scene is highlighted to make the area conspicuous against the surrounding area. By viewing this in the two-dimensional scene, the pilot's situational awareness could be immediately enhanced by conveying to him or her the area that has been scanned. This knowledge could let the pilot know that certain areas of the potentially stale a priori object data of the object data source 114 have been examined by the live sensor. Although the preceding discussion has been drawn to the use of a grey color for indicating the scanned area, the choice of color could be configurable by a manufacturer and/or end-user.

In addition to presenting information related to highlighting the area being scanned, the IPU 130 may be programmed to highlight the use of augmented data. As discussed above, a priori data stored in the object data source 114 may be augmented with real-time elevation data of the point cloud. In some embodiments, a synthetic scene that has been generated with augmented object data could be highlighted through the use of a color. For example, a blue color could be employed to indicate an area(s) where the a priori data was updated by what was seen by the live sensor. By visualizing this in the three-dimensional scene, the situational awareness of the pilot may be immediately enhanced by conveying to him or her where the on-board sensor(s) have detected "differences" from the a priori data. This knowledge could let the pilot know that certain areas of the potentially stale a priori data seem to be different. Together with a knowledge of what area(s) have and have not been scanned, the pilot may choose to examine those areas more closely. Although the preceding discussion has been drawn to the use of a blue color for indicating augmented data, the choice of color could be configurable by a manufacturer and/or end-user.

Figure 11:
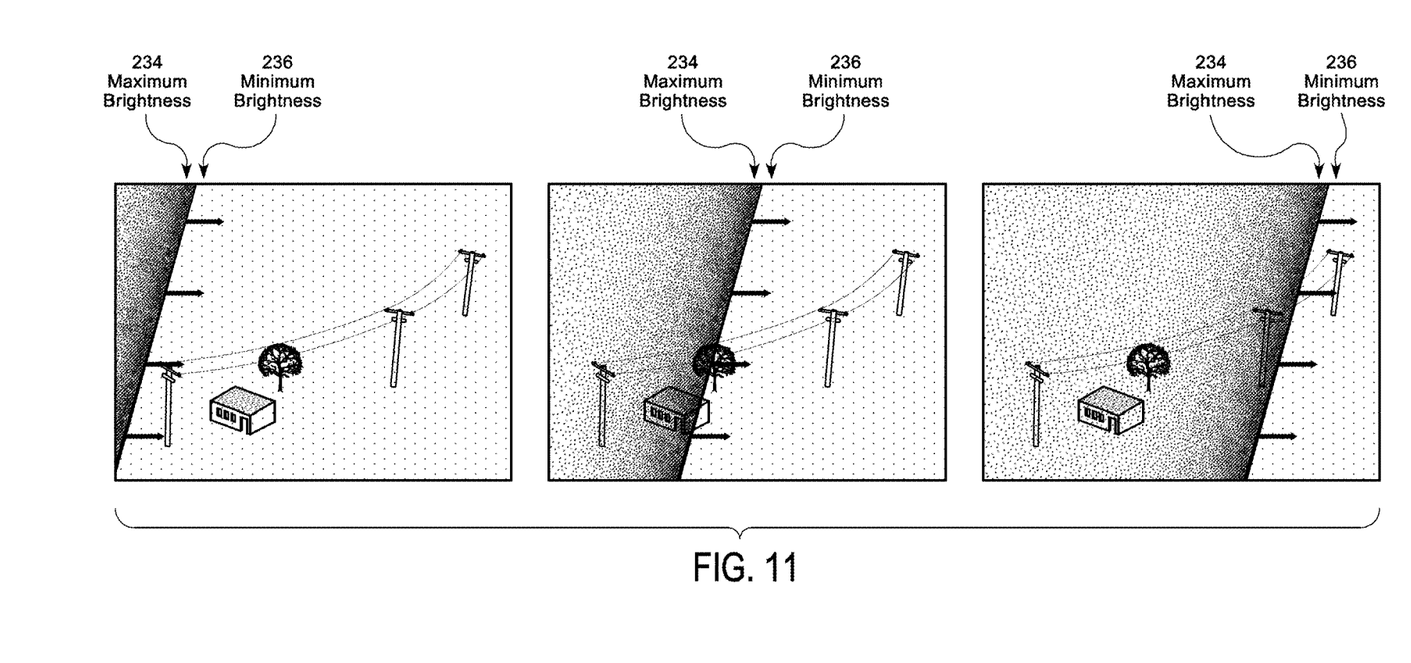
FIG. 11 illustrates a "wiper blade" highlighter scanning the external scene.

In addition to presenting information related to highlighting the use of augmented data, the IPU 130 may be programmed to convey a "staleness" of the scanned information being conveyed to the pilot by depicting a part of the scanned area that is currently being swept. For example, a "wiper blade" could move radially through the scene as shown in FIG. 11. As it scan moves left to right, the brightness of the scene could be varied so that a maximum brightness 234 depicts the part of the scanned area that has just been swept (to the left of the wiper blade) and a minimum brightness 236 depicts the part of the area that will be swept imminently (to the right of the wiper blade). Through the use of a "wiper blade" that moves thru the scene, the situational awareness of the pilot may be immediately enhanced by conveying to him or her the staleness of the scanned information. The color and highlighting effects for this depiction are configurable. Although the preceding discussion has been drawn to the use of varying brightness for indicating stale scanned data, the choice of an enhancement effect could be configurable by a manufacturer and/or end-user. Moreover, although the preceding discussion has been drawn to sweeps performed in the radial direction, the highlighting of stale scanned data may be applied to sweeps performed in the azimuth and elevation directions.

Figure 12:
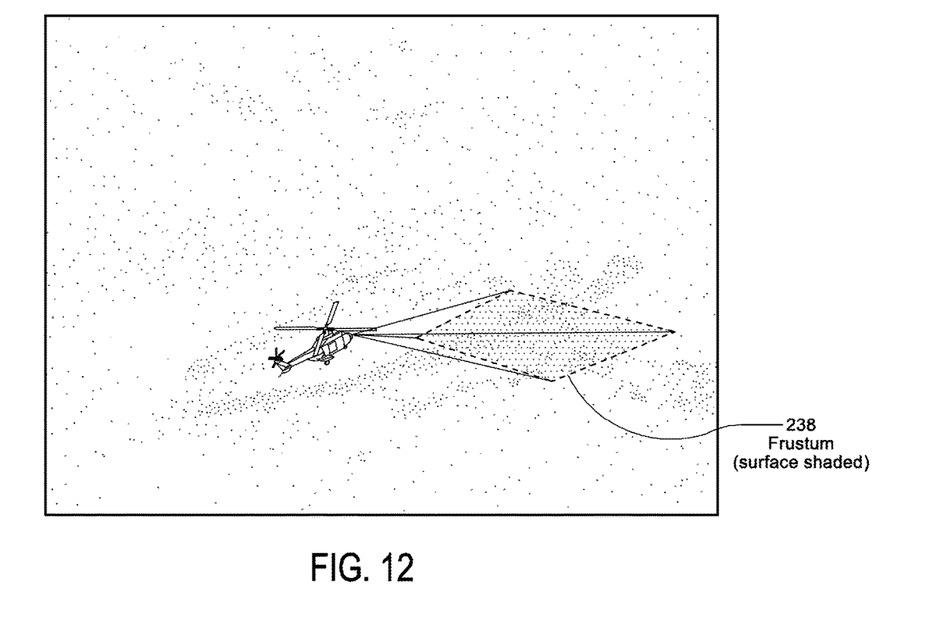
FIG. 12 illustrates a highlighter shading the surface within a viewing frustum.
Figure 13:
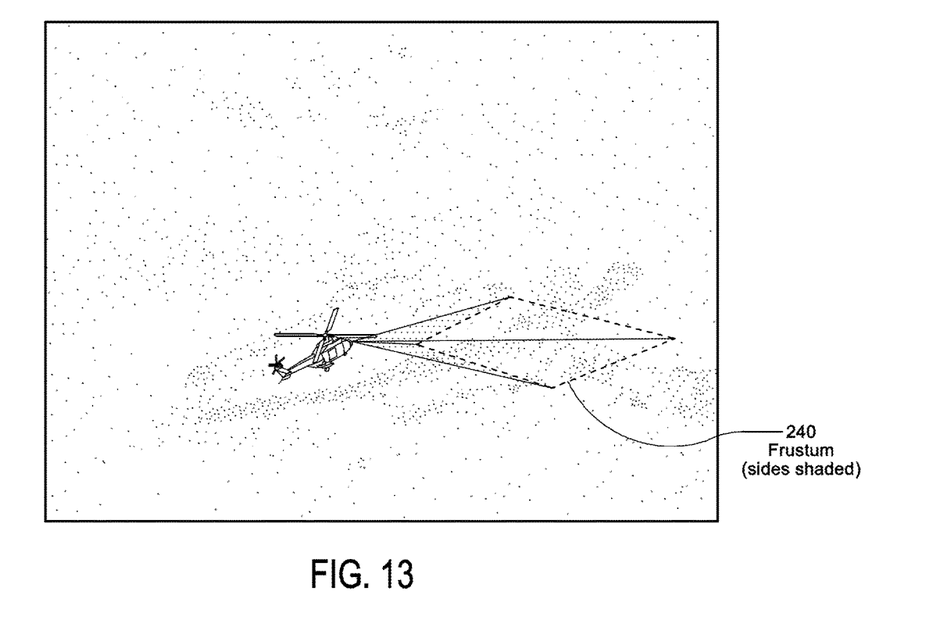
FIG. 13 illustrates a highlighter shading the sides of a viewing frustum.

The IPU 130 may be programmed modifying to an exocentric view of the synthetic scene, a scene that has been generated through the use of techniques known to those skilled in the art. In some embodiments, the exocentric view may be modified by depicting a sensor viewing frustum. As shown in FIG. 12, the surface located within the sensor viewing frustum could be shaded. As shown in FIG. 13, the sides of the sensor viewing frustum could also be shaded. The ability to visualize the viewing frustum of an on-board sensor increases the situational awareness provided by the three-dimensional synthetic scene by providing the pilot with an unambiguous depiction of how the sensor is sensing the actual external scene.

It should be noted that, although the preceding discussion has been drawn to an exocentric view that could be produced by the SVS 112 based upon, in part, terrain data found in the object data source 114, the depiction of the sensor viewing frustum is not limited to an exocentric view. In some embodiments, the disclosures discussed above for rendering the depiction of the sensor viewing frustum may be applied to a synthetic scene of an egocentric view.

Figure 14:
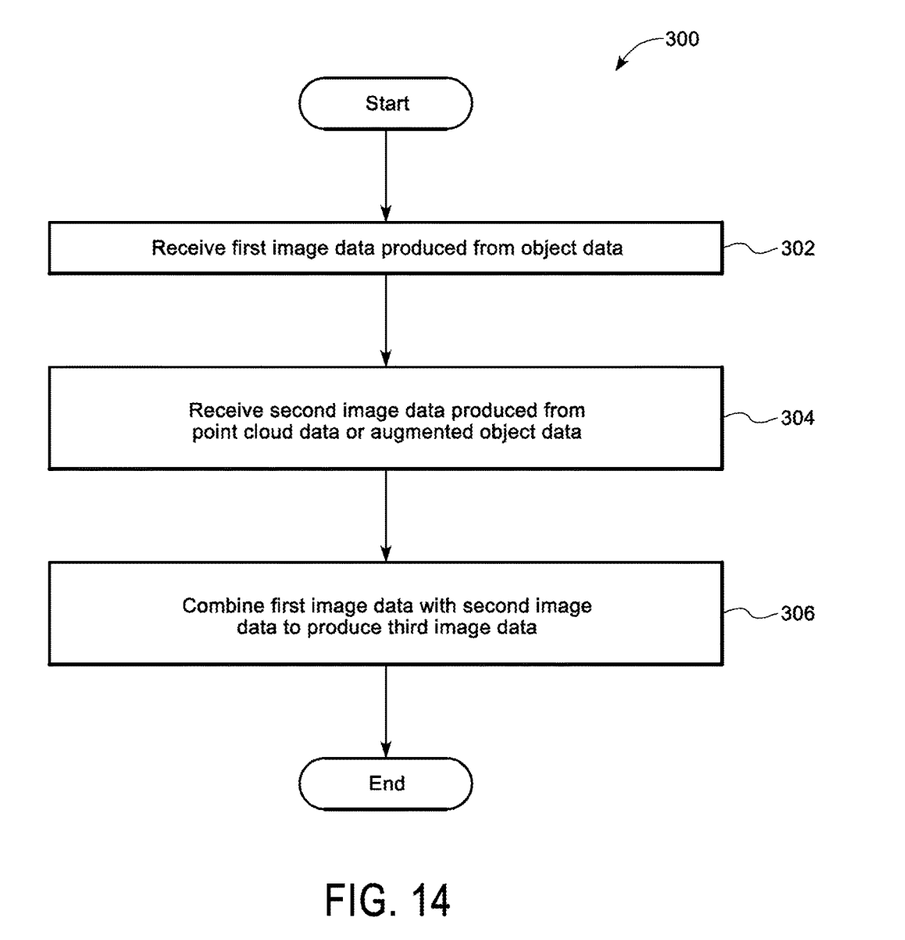
FIG. 14 illustrates a flowchart disclosing an embodiment of a method for enhancing a synthetic image.

FIG. 14 depicts flowchart 300 providing an example for enhancing a synthetic image that is presentable to a viewer, where the IPU 130 may be programmed or configured with instructions corresponding to the following modules. As embodied herein, the IPU 130 may be a processor unit of a module such as, but not limited to, a printed circuit card assembly having one or more input interfaces (e.g., virtual or physical computer ports) to facilitate data communications with the IPU 130, i.e., the receiving and providing of data (e.g., one or more electrical or optical signals including data and/or being indicative of data). For the accomplishment of the following modules embodied in FIG. 9, the receiving of data is synonymous and/or interchangeable with the retrieval of data, and the providing of data is synonymous and/or interchangeable with the making available, supplying, and/or sending of data.

The method of flowchart 300 begins with module 302 with the IPU 130 receiving of first image data representative of a first image of a first external scene. The first image could be a synthetic image received from the SVS 112 and produced from first resolution object data stored in the object data source 114. The first resolution object data could be non-augmented object data (e.g., object data not augmented by point cloud data). In embodiments, the SVS 112 may be comprised of the IPU 130 and/or the first image could be produced to a first scale.

The method of flowchart 300 continues with module 304 with the IPU 130 receiving of second image data representative of a second image of a second external scene. In some embodiments, the PCVS 116 may be comprised of the IPU 130 and/or the second image could be produced to a second scale which could be the same scale as the first scale.

In some embodiments, the second image could be comprised of a point cloud image received from the PCVS 116 and produced from at least one image capturing device such as, but not limited to, an active sensor and/or a passive sensor. The point cloud image may be comprised of a plurality of colors corresponding to a height color map, a range color map, and/or a landing suitability color map, where the landing suitability color map could be based upon a slope analysis and/or roughness analysis.

In some embodiments, the second image could be comprised of a second synthetic image and produced from second resolution object data. The second resolution object data could be non-augmented object data received from the object data source 114 that has been augmented with point cloud data. This augmentation could be performed by the SVS 112 configured to receive the point cloud data. Optionally, the second resolution object data could be stored augmented object data (e.g., object data that has been augmented with point cloud data and stored in the object data source 114) received from the object data source 114.

The method of flowchart 300 continues with module 306 with the IPU 130 combining of the first image data with the second image data to produce a third image data representative of a third image of the first external scene. In some embodiments, the third image may be comprised of an inset depicting the second image and placed within the first image, where the first image encompasses the second image. In some embodiments, the third image may be comprised of an overlay of second image placed against the first image.

In an embodiment in which first image data is representative of a first image (e.g., first synthetic image) of a first external scene, the second image data is representative of a second image (e.g., point cloud image) of a second external scene, and both are combined to produce the third image data representative of the third image (e.g., the first synthetic image with an inset of the point cloud image), the IPU 130 could receive fourth image data representative of a second synthetic image and produced from second resolution object data. In such an occasion, the third image data could be produced by combining the fourth image data (e.g., the second synthetic image data) with the first image data (e.g., first synthetic image data) and second image data (e.g., point cloud image data) to produce a second inset depicting the second synthetic image that is placed within the first image and overlaid by the second image (e.g., point cloud image).

In some embodiments, the second image could be comprised of one or more highlighters. One highlighter could highlight one or more non-terrain objects acquired by the PCVS 116 that are not represented in the object data from which the first image data has been produced. Another highlighter could highlight an area, either in part or in whole, being scanned by one or more image capturing devices. Another highlighter could highlight the first image, either in part or in whole, produced from object data augmented with point cloud data acquired by one or more image capturing devices. Another highlighter could highlight one or more sensor viewing frustums.

In some embodiments, the third image data could be provided to the display system 140 configured to receive third image data and present the third image on one or more display units of the display system 140. In some embodiments, the third image could be comprised of a two-dimensional view, a three-dimensional egocentric view, or a three-dimensional exocentric view. Then, the method of flowchart 300 ends.

It should be noted that the method steps described above may be embodied in computer-readable media stored in a non-transitory computer-readable medium as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all modifications, permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations, enhancements, equivalents, and improvements falling within the true spirit and scope of the present invention.

What is claimed is:

1. A system for enhancing an aircraft synthetic vision system (SVS) image presentable to a viewer, comprising:
first image data representative of a first viewable aircraft SVS image of an external scene produced from at least terrain data acquired from an object data source;
second image data representative of a viewable point cloud image of the external scene produced from at least one image capturing device;
third image data representative of a second viewable aircraft SVS image of the external scene produced from the at least terrain data augmented with the viewable point cloud data acquired by the at least one image capturing device; and an image processing unit configured to:
receive the first, second, and third image data; and
combine the first, second, and third image data to produce fourth image data representative of a fourth image of the external scene presentable to a viewer, such that
the fourth image includes an inset depicting the second viewable aircraft SVS image placed within the first viewable aircraft SVS image and overlaid by the viewable point cloud image.

2. The system of claim 1, wherein the viewable point cloud image includes a plurality of colors corresponding to at least one of a height color map, a range color map, and a landing suitability color map.

3. The system of claim 2, wherein the landing suitability color map is based upon a roughness analysis, a slope analysis, or a combination of both analyses.

4. The system of claim 1, wherein
the viewable point cloud image is comprised of at least one highlighter of a plurality of highlighters, where
a first highlighter highlights at least one non-terrain object acquired by a point cloud system that is not represented in the object data from which the first image data is produced,
a second highlighter highlights at least a part of an area currently being scanned by the at least one image capturing device,
a third highlighter highlights at least a part of the second viewable aircraft SVS image, and
a fourth highlighter highlights at least one sensor viewing frustum.

5. A device for enhancing an aircraft synthetic vision system (SVS) image presentable to a viewer, comprising:
an image processing unit configured to:
receive first image data representative of a first viewable aircraft SVS image of an external scene produced from at least terrain data acquired from an object data source;
receive second image data representative of a viewable point cloud image of the external scene produced from at least one image capturing device;
receive third image data representative of a second viewable aircraft SVS image of the external scene produced from the object data augmented with the viewable point cloud data acquired by the at least one image capturing device; and
combine the first, second, and third image data to produce fourth image data representative of a fourth image of the external scene presentable to a viewer, such that
the fourth image includes an inset depicting the second viewable aircraft SVS image placed within the first viewable aircraft SVS image and overlaid by the viewable point cloud image.

6. The device of claim 5, wherein the viewable point cloud image includes a plurality of colors corresponding to at least one of a height color map, a range color map, and a landing suitability color map.

7. The device of claim 5, wherein the landing suitability color map is based upon a roughness analysis, a slope analysis, or a combination of both analyses.

8. The device of claim 5, wherein
the viewable point cloud image is comprised of at least one highlighter of a plurality of highlighters, where
a first highlighter highlights at least one non-terrain object acquired by a point cloud system that is not represented in the object data from which the first image data is produced,
a second highlighter highlights at least a part of an area currently being scanned by the at least one image capturing device,
a third highlighter highlights at least a part of the second viewable aircraft SVS image, and
a fourth highlighter highlights at least one sensor viewing frustum.

9. A method for enhancing an aircraft synthetic vision system (SVS) image presentable to a viewer, comprising:
receiving first image data representative of a first viewable aircraft SVS image of an external scene produced from at least terrain data acquired from an object data source;
receiving second image data representative of a viewable point cloud image of the external scene produced from at least one image capturing device;
receiving third image data representative of a second viewable aircraft SVS image of the external scene produced from the object data augmented with the viewable point cloud data acquired by the at least one image capturing device; and
combining the first, second, and third image data to produce fourth image data representative of a fourth image of the external scene presentable to a viewer, such that
the fourth image includes an inset depicting the second viewable aircraft SVS image placed within the first viewable aircraft SVS image and overlaid by the viewable point cloud image.

10. The method of claim 9, wherein the viewable point cloud image includes a plurality of colors corresponding to at least one of a height color map, a range color map, and a landing suitability color map.

11. The method of claim 9, wherein the landing suitability color map is based upon a roughness analysis, a slope analysis, or a combination of both analyses.

12. The method of claim 9, wherein
the viewable point cloud image is comprised of at least one highlighter of a plurality of highlighters, where
a first highlighter highlights at least one non-terrain object acquired by a point cloud system that is not represented in the object data from which the first image data is produced,
a second highlighter highlights at least a part of an area currently being scanned by the at least one image capturing device,
a third highlighter highlights at least a part of the second viewable aircraft SVS image, and
a fourth highlighter highlights at least one sensor viewing frustum.

* * * * *